United States Patent [19]

Capolupo et al.

[11] Patent Number: 4,797,511
[45] Date of Patent: Jan. 10, 1989

[54] POLYETHYLENE STABILIZED BY MIXTURE OF HINDERED PHENOL AND AMINE ANTIOXIDANTS

[75] Inventors: Janet D. Capolupo, Watertown; Thomas M. Chucta, Naugatuck, both of Conn.

[73] Assignee: Uniroyal Chemical Company, Inc., Middlebury, Conn.

[21] Appl. No.: 101,318

[22] Filed: Sep. 25, 1987

[51] Int. Cl.$^4$ ............................................. C08K 5/36
[52] U.S. Cl. .............................. 174/110 PM; 524/87; 524/289
[58] Field of Search .................. 524/87, 258, 255, 289, 524/247, 343, 496; 560/75; 174/110 PM

[56] References Cited

U.S. PATENT DOCUMENTS

| 2,562,803 | 7/1951 | Mankowich | 524/247 |
|---|---|---|---|
| 2,951,821 | 9/1960 | Kesling | 524/496 |
| 3,285,855 | 11/1966 | Dexter et al. | 524/289 |
| 3,304,283 | 2/1967 | Hawkins et al. | |
| 3,422,056 | 1/1969 | Carton | 524/496 |
| 3,432,578 | 3/1969 | Martin | |
| 3,452,056 | 6/1969 | Sundholm | |
| 3,457,286 | 7/1969 | Dexter et al. | 524/258 |
| 3,505,225 | 4/1970 | Wheeler | |
| 3,536,661 | 10/1970 | Hagemeyer et al. | 524/330 |
| 3,567,664 | 3/1971 | Haring | |
| 3,637,865 | 1/1972 | Haring | |
| 3,655,559 | 4/1972 | Holt | |
| 3,901,849 | 8/1975 | Dodson | 524/87 |
| 3,979,180 | 9/1976 | Lorand | |
| 4,007,230 | 2/1977 | Hinze | |
| 4,341,677 | 7/1982 | Tamosauskas | |
| 4,420,579 | 12/1983 | Braid | |
| 4,440,671 | 4/1984 | Turbett | |
| 4,497,931 | 2/1985 | Hollis | |

FOREIGN PATENT DOCUMENTS 59-98148 6/1984 Japan .

OTHER PUBLICATIONS

Chem. Abstracts 105:61950t (Issue 18, 1986).

Primary Examiner—Veronica P. Hoke
Attorney, Agent, or Firm—Raymond D. Thompson

[57] ABSTRACT

A composition stabilized against oxidative degradation comprising: a polyolefin, carbon black homogeneously incorporated in said polyolefin, a stabilizing amount of thiodiethylene bis(3,5-di-t-butyl-4-hydroxy)hydrocinnamate first stabilizer component incorporated into said polyolefin and a second stabilizer component of at least one amine antioxidant selected from the group consisting of a para-substituted aralkyl-substituted diphenylamine; a para-phenylenediamine and a polymerized dihydroquinoline incorporated into said polyolefin.

7 Claims, No Drawings

POLYETHYLENE STABILIZED BY MIXTURE OF HINDERED PHENOL AND AMINE ANTIOXIDANTS

BACKGROUND OF THE INVENTION

This invention relates to the stabilization of polyethylene resin against thermal-oxidative degradation by the use of mixtures of a particular high molecular weight sterically hindered phenol and selected amine antioxidants. In particular linear low density polyethylene having a carbon black loading can be stabilized for use in applications such as wire and cable jacketing.

BACKGROUND ART

The problem of achieving thermal-oxidative stabilization of polymeric resins is a long-standing one in the wire and cable industry. It is known to stabilize polyolefins, such as polyethylene with N,N'-dibetanapthyl-p-phenylenediamine which is commercially available from R. T. Vanderbilt Co. as Agerite White. This composition provides good thermal stability, but there is a need to find substitutes which are biologically inert materials.

U.S. Pat. No. 4,440,671 teaches stabilization of ethylene polymers against degradation evidenced by tiny cracks, called water trees. The stabilization requires the use of high molecular weight polyethylene glycols with a hydrocarbon substituted diphenylamine such as octylene or styrene alkylated diphenylamine. Optionally, this system can be used with optional antioxidants such as hindered phenols and amines, polymerized 2,2,4-tetramethylhydroquinoline, and sulfur-containing antioxidant materials such as thiodiethylene bis(3,5,di-t-butyl-4-hydroxy)hydrocinnamate.

It has been unexpectedly found that with carbon black present, only a select few of the suggested materials demonstrate enhansed protection against severe mechanicl degradation during processing.

Japanese patent publication No. 1984-98148 teaches the discoloration inhibition of cross-linked polyolefins using 4,4'bis-(2,2'-dimethylbenzyl)diphenylamine with optional antioxidants which are liquid at room temperature such as:
4,4'-thiobis(7-tert-butyl-3-methylphenol);
dilauryl dithiopropionate;
2,2,-thio[diethyl bis-3-(3,5 diethyl-tert-butyl-4-hydroxyphenyl)]propionate.
These polyolefins necessarily contain cross-linking agents such as the well-known organic peroxides.

It has been surprisingly found that only a very select number of the materials disclosed as useful in the prior demonstrate synergistic effect when used in combination to protect polyolefins.

BRIEF DESCRIPTION OF INVENTION

An object of the invention is to provide a synergistic improvement in the level of thermal-oxidative stability protection for polyethylene homopolymer resins. A further object is to protect carbon black loaded linear low density polyethylene from degradation caused by intense shearing and mastication resulting from processing of the polyethylene resin in production of finished products. An advantage of the invention is that the polyethylene resin may be provided with substantially greater degrees of protection as defined by an oxidative induction time.

The benefits and advantages of the invention may be obtained using a composition stabilized against oxidative degradation comprising: a polyolefin, carbon black homogeneously incorporated in said polyolefin, a stabilizing amount of thiodiethylene bis(3,5-di-t-butyl-4-hydroxy)hydrocinnamate first stabilizer component incorporated into said polyolefin and a second stabilizer component of at least one amine antioxidant selected from the group consisting of a para-substituted aralkyl-substituted diphenylamine; a para-phenylenediamine and a polymerized dihydroquinoline incorporated into said polyolefin.

DETAILED DESCRIPTION OF INVENTION

The material which has been unexpectedly found to have synergistic effect when used with amine antioxidants is a high molecular weight, highly sterically hindered phenol known as thiodiethylene bis(3,5-di-t-butyl-4hydroxy)hydrocinnamate. It is known in other nomenclature as thiodiethylene bis(3,5-di-t-butyl-4hydroxyphenyl)propionate. The material is commercially available as IRGANOX 1035 from Ciba-Geigy Corporation. The approximate molecular weight is 642, the melt point 63° C., specific gravity 1.19. Such materials are known to be antioxidants for plastics and elastomers. This material was found to be a synergist for a group of amine compounds which have historically been used as antioxidants or antiozonants in rubbers and plastics. It will be generally referred to hereinafter as simply the synergist.

The first class of useful materials are the para-hydrocarbon substituted diphenylamines such as the aryl-, alkyl- and aralkyl-para-substituted diphenylamine antioxidant materials. A non-limitive list of commercially available para-hydrocarbon substituted diphenylamines include: para-substituted octylated, nonylated or heptylated diphenylamines; para-substituted styrenated or alpha-methyl styrenated diphenylamine. The sulfur-containing hydrocarbon substituted diphenylamines are not also considered part of this class. A representative material of this excluded type is p-(p-toluenesulfonyl amido)-diphenylamine, available commercially as ARANOX from Uniroyal Chemical Company, Inc.

The second class of amine antioxidants are the reaction products of a diarylamine and an aliphatic ketone. The diarylamine aliphatic keton reaction products which are useful herein are disclosed in U.S. Pat. Nos. 1,906,935; 1,975,167; 2,002,642 and 2,562,802. Briefly described, these products are obtained by reacting a diarylamine, preferably a diphenylamine, which may or may not possess one or more substituents on either aryl group with an aliphatic ketone, preferably acetone, in the presence of a suitable catalyst. In addition to diphenylamine, other suitable diarylamine reactants include dinaphthyl amines, p-nitrodiphenylamine, 2,4-dinitrodiphenylamine, p-aminodiphenylamine; p-hydroxydiphenylamine, etc. Besides acetone, other useful ketone reactants include methylethylketone, diethylketone, monochloroacetone, dichloroacetone, etc.

A preferred diarylamine-alphiphatic ketone reaction product is that obtained from the condensation reaction of diphenylamine and acetone (NAUGARD A, Uniroyal Chemical), e.g., in accordance with the conditions described in U.S. Pat. No. 2,562,802. The commercial product is supplied as a light tan-green powder or as greenish brown flakes and has a melt range of from 85–95° C.

The third class of suitable amines are the N,N' hydrocarbon substituted p-phenylene diamines. The hydrocarbon substituent may be alkyl or aryl groups. Representative materials are:

N-phenyl-N'-cyclohexyl-p-phenylenediamine;
N-phenyl-N'-sec.-butyl-p-phenylenediamine;
N-phenyl-N'-isopropyl-p-phenylenediamine;
N-phenyl-N'-(1,3-dimethylbutyl)-p-phenylenediamine;
N,N'-bis-(1,4-dimethylpentyl)-p-phenylenediamine;
N,N'-diphenyl-p-phenylenediamine;
N,N'-di-beta naphthyl-p-phenylenediamines;mixed diaryl-p-N,N'-bis-(1-ethyl-3-methylpentyl)-p-phenylenediamine and
N,N'-bis-(1-methylheptyl)-p-phenylenediamine.

The term hydrocarbon substituted, is limitive and specifically excludes materials which have other than carbon and hydrogen atoms in the para-substituted groups. Thus, a material such as N-phenyl-N'-(p-toluenesulfonyl)-p-phenylenediamine is specifically excluded from this defined class of paraphenylenediamines. The sulfur linkage is detrimental to the synergistic effect as is shown later in the negative Example 25.

The fourth material for which the synergist was found to be effective was the group of antioxidant-type materials based on quinoline. Representative materials of this class include: polymerized 2,2,-trimethyl-1,2dihydroquinoline; 6-dodecyl-2,2,4-trimethyl-1,2dihydroquinoline and 6-ethoxy-2,2,4-trimethyl-1-2-dihydroquinoline.

The polyolefin being stabilized may be selected from any of the high molecular weight non-cross-linked homopolymers or copolymers made form alpha olefin monomers such as polyethylene, polypropylene, polyisobutylene, polymethylbutane-1, copolymers derived from two or more such monomers such as ethylene-propylene copolymers, propylene-butene-1 copolymers, propylene-isobutylene copolymers; and blends of the foregoing homopolymers and/or copolymers thereof. The polyethylenes which are more preferred are the low density (LDPE), high density (HDPE) and most preferred is the linear low density polyethylene (LLDPE) which is commonly produced as a copolymer of ethylene and 1 butene, octene or a higher alkylene hydrocarbon monomer. The term, polyolefin, as it relates to this invention is intended to include only non-cross-linked polymers, which do not contain the conventional cross-linking agents, such as the organic peroxides. The most common class are the cross-linked polyethylenes which contain such cross-linking agents in the pre-cross-linked stages of manufacture. These are specifically excluded from this defined class of polyolefins. These cross-linked materials present unique variables which are not present in non-cross-linked polyolefins, and this invention does not address those variables.

The ratio of the synergist to the amine antioxidant may vary from 9:1 to 1:9. A more preferred range is 3:1 to 1:3 with most prefered being from 2:1 to 1:2. Amounts by weight to be added will vary by application and service condition but will generally lie between about 0.05 to 3 percent by weight based on the base resin. A more preferred range is between 0.1 and 1 percent, with most preferred being 0.15 to 0.75 percent weight percent. All weight percents are expressed as the combined weights of the synergist and the amine antioxidant material. Carbon black load is an important component in the protection system. It may be present from 0.01 to 20 percent, more preferably 0.1 to 10 percent, and most preferred 1 to 5 weight percent.

PREFERRED EMBODIMENTS OF THE INVENTION

In order to evaluate the antioxidant activity in a black loaded polyethylene material it is necessary to expose the polyethylene to extremely severe mechanical mastication at relatively high temperatures. Such conditions accelerate the degradation which is seen during service only over extremely long periods of exposure. A test method is recognized in the telecommunication industry for screening antioxidant activity in cable jacketing formulations. This test method utilizes an enclosed mixing head in which the polyethylene is masticated using Sigma-type mixing blades for a period of one hour at 200° C.

Once the intensive high temperature mixing stage is complete it is necessary to evaluate [by a reproducible test method]the relative oxidative stability of the resulting polymer. The test method utilized is generally described as Oxidative Induction Times (OIT) in which a differential scanning calorimeter (DSC) is utilized to determine the onset of oxidation.

TEST SAMPLE PREPARATION

The formulations utilizing a variety of antioxidant packages were prepared by mixing 40 gram batches prepared by weighing linear low density polyethylene resin (DFH-2076 available from Union Carbide) and the antioxidant to be tested into a mixing vessel. The dry resin and antioxidants were then homogenized into a dry blend. In all examples and Controls A and B, a carbon black concentrate consisting of 35 percent carbon black and 65 percent LLDPE resin (DFH-20760) was also mixed and dispersed in the mixing vessel with the dry blend. The final concentration of carbon black was 2.6 weight percent in the final mix. The carbon black concentrate contained 0.15 percent 4,4'-thiobis(6-t-butyl-m-cresol). This stabilizer from the carbon black concentrate amounts to only 0.0001 by weight of the final mix, and was deemed not to materially affect the results.

The formulations were mixed for one hour at 200° C. in a C. W. Brabender mixing head containing Sigma-type mixing blades. The model designation was REE-6-230V. The Brabender was run at 125 RPM with the ram closed. This mixing step induced thermal-oxidative degradation. It provides a method of comparing of antioxidant activity in an accelerated test. It simulates extensive extrusion heat history as well as long-term oxidative exposure. This test method is recognized in the telecommunication industry as a good method for screening materials for use as wire and cable jacketing.

The mixed formulations were then compression molded into 10 mil (0.25 mm) thick films by adding the formulation which had been formed into cubes subsequent to the Brabender mixing step. The 0.25 mm films were formed by compressing the cubed formulation between solid platens lined with polyester sheeting and heated to 140° C. for 3 minutes at a minimum pressure. Then a two minute cycle at 40,000 psig (275 MPa) was used to compress the formulation into the final 0.25 mm film. Following molding, the formed films were water quenched to solidify the films prior to removal.

Oxidative Induction Times

Circular discs were cut from the 0.25 mm films for placement in aluminum pans for use in a Perkin-Elmer DSC-2C type differential scanning calorimeter (DSC). The test chamber of the DSC calibrimeter was purged with nitrogen during conditioning to an isocratic temperature of 235° C. followed by an immediate change to oxygen at a flow rate of 20 cc's per minute to induce thermaloxidative degradation. Oxidative Induction Time (OIT) is the time span in minutes between reaching an isocratic temperature of 235° C. when the oxygen environment is introduced and the time at which the DSC detects the onset of oxidation.

EXAMPLES 1-20

The following test formulations were utilized in evaluating the synergistic properties of thiodiethylene bis(3,5-di-t-butyl-4-hydroxy)hydrocinnamate.

The following table of stabilizers sets forth the chemical identity and shortened identification acronyms used in the subsequent tables of results.

Controls A and B were blanks, that is the base formulation was tested for oxidative stability without any additional stabilization. Table I sets forth the results where the synergist was tested alone at 0.2 parts and the particular amines were tested alone at 0.2 of a part and compared to the blend of the synergist and the amine at 0.1 parts for each component. The oxidative induction time was run at 235° C. according to the preceding described test procedure. The oxidative induction time (hereinafter OIT) is expressed for the blend each component alone. The Improvement Factor column shows a value only for the blend, and it is calculated as follows: the Improvement Factor=the OIT of the blend divided by the arithmatic average of the OIT of each individual component. Synergistic effect is defined as having been demonstrated by Improvement Factor values of 1.4 and above.

| Designation | Trade Name | Chemical Class | Chemical Name |
| --- | --- | --- | --- |
| SYNERGIST | IRGANOX 1035 Ciba-Geigy Corp. | Multifunctional hindered phenol | thiodiethylene bis(3,5-di-t-butyl-4 hydroxy) hydrocinnamate |
| DPA-2 | NAUGARD 445 Uniroyal Chemical Company | Aralkyl-substituted diphenylamine | 4,4'-bis-(alpha,alpha-dimethylbenzyl) diphenylamine |
| PQ | NAUGARD Q Uniroyal Chemical Company | Polymerized quinoline | polymerized 2,2,4-trimethyl-1,2-dihydroquinoline |
| PPDA | FLEXZONE 7F Uniroyal Chemical Company | Para-phenylenediamine | N—phenyl-N'—(1,3-dimethylbutyl)-p-phenyldiamine |
| Phenol-1 | NAUGARD XL-1 Uniroyal Chemical Company | Sterically hindered phenol | 2,2'oxamidobisethyl 3-(3,5-di-t-butyl-4 hydroxyphenyl) |
| Phenol-2 | IRGANOX 1010 Ciba-Geigy Corp. | Multifunctional hindered phenol | tetrakis propionate methylene (3,5-di-t-butyl-4-hydroxy hydrocinnamate) methane |
| ARANOX | ARANOX Uniroyal Chemical Company | Sulfur-containing substituted diphenylamine | p-(p-tolunesulfonyl amido)-diphenylamine |

TABLE I
OXIDATIVE INDUCTION TIMES (OIT) FOR BLACK LOADED LLDPE

| Example | Additive | Level, % Weight | Oxidative Induction Time, (OIT) Minutes at 235° C. | Improvement Factor (IF) |
| --- | --- | --- | --- | --- |
| Control A | None | — | 0.3 | — |
| 1 | SYNERGIST/DPA | .1/.1 | 8.8 | 3.3 |
| 2 | SYNERGIST Alone | 0.2 | 5.3 | — |
| 3 | DPA Alone | 0.2 | 0.1 | — |
| 4 | SYNERGIST/PQ | .1/.1 | 13.0 | 3.4 |
| 5 | SYNERGIST Alone | 0.2 | 5.3 | — |
| 6 | PQ Alone | 0.2 | 2.2 | — |
| 7 | SYNERGIST/PPDA | .1/.1 | 19.7 | 1.7 |
| 8 | SYNERGIST Alone | 0.2 | 5.3 | — |
| 9 | PPDA Alone | 0.2 | 17.9 | — |

| TEST FORMULATIONS | |
| --- | --- |
| | Percent by Weight |
| LLDPE Base Resin (DFH-2076 Union Carbide) | 92.3 |
| Carbon Black/Resin Concentrate (35 percent carbon black/65 percent base resin) | 7.5 |
| Stabilizer (Identity and Amounts Variable) | 0.2 |
| | 100.0 |

It is noted that without allowance for experimental error any value of an Improvement Factor above 1.0 could be considered a synergistic effect. However, in order to allow for some experimental variation, the higher value of 1.4 as a lower threshhold for synergism was determined to be prudent.

It is noted that the thiodiethylene bis(3,5-di-t-butyl-4-hydroxy)hydrocinnamate synergist shows an Improvement Factor of 3.3 when used with the alpha methyl styrenated diphenylamine (DPA), 3.4 when used with the polymerized hydroquinoline (PQ) and 1.7 when used with the N-phenyl-N'-(1,3-dimethylbutyl)-p-phenylenediamine (PPDA). The Improvement Factors noted in Table I show significant synergistic effect when used in black loaded linear low density polyethylene. Table II sets forth the identical materials tested in an identical manner with the exception that the oxidative induction time was tested at 215° C. It is noted that at this lower test temperature the OIT's are proportionally longer than the results reported in Table I.

TABLE II

OXIDATIVE INDUCTION TIMES (OIT) IN BLACK LLDPE RESIN

| Example | Additive | Level | Oxidative Induction Time, (OIT) Minutes* 215° C. | Improvement Factor (IF) |
|---------|----------|-------|---------------------------------------------------|-------------------------|
| Control B | None | — | 0.4 | — |
| 10 | SYNERGIST/DPA | .1/.1 | 30.8 | 3.8 |
| 11 | SYNERGIST Alone | 0.15 | 14.0 | — |
| 12 | DPA Alone | 0.15 | 0.7 | — |
| 13 | SYNERGIST/PQ | .1/.1 | 60.3 | 5.5 |
| 14 | SYNERGIST Alone | 0.15 | 14.0 | — |
| 15 | PQ Alone | 0.15 | 7.7 | — |
| 16 | SYNERGIST/PPDA | .1/.1 | 30.6 | 1.4 |
| 17 | SYNERGIST Alone | 0.15 | 14.0 | — |
| 18 | PPDA Alone | 0.15 | 29.1 | — |

*Improvement Factor = $OIT_{A/B}/\frac{1}{2}(OIT_A + OIT_B)$ ie, $IF_{Example\ 10} = 30.8/\frac{1}{2}(14 + 0.7) = 3.8$ The slightly lower temperature shows a slight variation in the Improvement Factors but, consistently, the synergism is shown with the polymerized hydroquinoline showing a better improvement factor of 5.5 at the lower OIT temperature. The PPDA shows a slightly lower value of 1.4 versus 1.7. These values show the synergistic effect of the blend of the invention.

NEGATIVE EXAMPLES 19-27

A series of experimental evaluations of other classes of materials revealed that the synergist of the invention failed to show synergy when used with other highly sterically hindered phenols, such those as identifed as Phenol-1 and Phenol-2. Similarly, the sulfonyl-containing paraphenylenediamine or diphenylamine represented by ARANOX failed to show the synergistic effect of the other classes. This non-hydrocarbon substituted material is specifically outside of the classes of suitable amines of this invention.

Table III summarizes the results of these evaluations. The hindered phenol antioxidants evaluated in Examples 19 and 22 in blends with thiodiethylene bis(3,5-di-t-butyl-4-hydroxy)hydrocinnamate show improvement factors of 1.2 and 1.0, respectively, which indicate either no effect or nominal effect using the Improvement Factor formula previously defined. Therefore, for the purpose of this invention, synergy has not been shown for hindered phenols.

Similarly, Example 25 shows the thiodiethylene bis(3,5-di-t-buryl-4hydroxy)hydrocinnamate with the ARANOX showed a nominal decrease to 0.9 for Improvement Factor. This decrease shows that there is no synergistic effect.

COMMERICAL APPLICABILITY

The stabilization of polyethylene resins, both cross-linked and non-cross-linked, is extremely important in particular applications. Particularly long-term servicability is important in the jacketing for wire and cable where the wiring must maintain its stability over very long lengths of time, such as 20 to 30 years or longer, in both indoor and outdoor applications. The synergy of this invention is demonstrated in black loaded compositions where the slight discoloration which may be present in the use of certain diphenylamine antioxidants and the polymerized hydroquinone materials is not a detrimental factor. The ability to stabilize polymers such as linear low density polyethylene against long-term degradation is an important step forward in technology.

In view of the many changes and modifications that may be made without departing from principles underlying the invention, reference should be made to the appended claims for an understanding of the scope of the protection afforded in the invention.

We claim:
1. A composition stabilized against oxidative degradation comprising:
(a) a non-cross-linked polyolefin;
(b) 0.1 to 20 weight percent carbon black homogeneously incorporated in said polyolefin;
(c) an effective amount of thiodiethylene bis(3,5 di-t-butyl-4-hydroxy)hydrocinnamate incorporated into said polyolefin; and
(d) an amine antioxidant based on quinoline selected from the group consisting of polymerized quinoline, 6-dodecyl-2,2,4-trimethyl-1,2-dithydroquino-

TABLE III

NEGATIVE EXAMPLES
OXIDATIVE INDUCTION TIMES (OIT) FOR BLACK LOADED LLDPE

| Example | Additive | Level, % Weight | Oxidative Induction Time, (OIT) Minutes | Improvement Factor (IF) |
|---------|----------|-----------------|------------------------------------------|-------------------------|
| 19 | SYNERGIST/Phenol-1 | .1/.1 | 5.5 | 1.2 |
| 20 | SYNERGIST Alone | 0.2 | 5.3 | — |
| 21 | Phenol-1 Alone | 0.2 | 4.2 | — |
| 22 | SYNERGIST//Phenol-2 | .1/.1 | 6.7 | 1.0 |
| 23 | SYNERGIST Alone | 0.2 | 5.3 | — |
| 24 | Phenol-2 Alone | 0.2 | 7.6 | — |
| 25 | SYNERGIST/ARANOX | .1/.1 | 7.2 | 0.9 |
| 26 | SYNERGIST Alone | 0.2 | 5.3 | — |
| 27 | ARONAX Alone | 0.2 | 10.6 | — | line and 6 ethyoxy-2,2,4-trimethyl-1,2-dihydroquinoline, wherein thiodiethylene bis(3,5 di-t-butyl-4-hydroxy) hydrocinnamate and said amine antioxidant constitute a combined weight percent of about 0.05 to about 3.0.

2. A polyolefin composition according to claim 1, wherein said antioxidant is polymerized 2,2,4-trimethyl-1,2-dihydro-quinoline.

3. A polyolefin composition according to claim 1, wherein said polyolefin is a linear low density polyethyle.

4. A polyolefin composition according to claim 1, wherein said carbon black is present at between 0.2 and 10 weight percent of said polyolefin composition.

5. A polyolefin according to claim 1, wherein said thiodiethylene bis(3,5 di-t-butyl-4-hydroxy)hydrocinnamate and said amine antioxidant constitute a combined weight percent of about 0.1 to about 1.0.

6. A polyolefin composition according to claim 5, wherein said thiodiethylene bis(3,5 di-t-butyl-4-hydroxy)hydrocinnamate and said amine antioxidant are present in a ratio of between 3:1 and 1:3.

7. A conductive cable comprising: an elongate electrical conductor extending lengthwise through said cable, said conductor being surrounded by a jacket composed of a polyolefin composition stabilized against oxidative degradation composed of a polyolefin with carbon black homogeneously incorporated in said polyolefin, an effective amount of thiodiethylene bis(3,5 di-t-butyl-4-hydroxy)hydrocinnamate incorporated into said polyolefin and an amine antioxidant selected from the group consisting of polymerized quinoline, 6-dodecyl-2,2,4-trimethyl-1,2-dihydroquinoline and 6 ethoxy-2,2,4-trimethyl-1,2-dihydroquinoline.

* * * * *